United States Patent [19]

Nakano et al.

[11] Patent Number: 5,293,238
[45] Date of Patent: Mar. 8, 1994

[54] TELEVISON CAMERA

[75] Inventors: Takahiro Nakano, Ibaraki; Takuya Imaide, Kanagawa, both of Japan

[73] Assignee: Hitachi, Ltd., Tokyo, Japan

[21] Appl. No.: 899,250

[22] Filed: Jun. 16, 1992

[30] Foreign Application Priority Data

Jun. 24, 1991 [JP] Japan .................................. 3-151452

[51] Int. Cl.$^5$ ............................................. H04N 5/335
[52] U.S. Cl. ..................................... 348/226; 348/229; 348/910
[58] Field of Search ...................... 358/213.18, 213.15, 358/213.19, 167; H04N 5/335

[56] References Cited

U.S. PATENT DOCUMENTS

| | | | |
|---|---|---|---|
| 4,670,787 | 6/1987 | Levine | 358/161 |
| 4,774,588 | 9/1988 | Noda et al. | 358/213.19 |
| 4,992,855 | 2/1991 | Takei | 358/29 |
| 5,204,741 | 4/1993 | Sakaguchi | 358/105 |

*Primary Examiner*—Michael T. Razavi
*Assistant Examiner*—Tuan V. Ho
*Attorney, Agent, or Firm*—Fay, Sharpe, Beall, Fagan, Minnich & McKee

[57] ABSTRACT

Flicker which occurs when a television camera images an object under illumination of a flickering light source such as fluorescent lamp is minimized without causing sensitivity of a photoelectric conversion element and hence the camera to be degraded under a non-flickering light source. The television camera includes an automatic iris control device, an automatic gain control circuit, a microcomputer, a photoelectric conversion element and an integration circuit for integrating output signal of the photoelectric conversion element for each field period. The microcomputer sets a signal storage time of the photoelectric conversion element to a value by which flicker noise can be restricted when flicker is detected on the basis of a change of an output signal of the integration circuit and sets it to another value when a change of light source is detected on the basis of a change of iris value and gain.

5 Claims, 3 Drawing Sheets

TELEVISON CAMERA

BACKGROUND OF THE INVENTION

The present invention relates to a television camera including an optical system, a photoelectric conversion element and an automatic iris control portion and, particularly, to a television camera capable of restricting flicker noise generated under a flickering light source such as fluorescent lamp and of obtaining an optimum imaging conditions even under illumination of light source other than fluorescent lamp.

In a case where an object illuminated with, for example, a fluorescent lamp is to be imaged by means of a television camera, it has been known that flicker noise is generated due to beat of field frequency of the television camera and frequency-dependent variation of amount of fluorescent light. In NTSC system, for example, the field period is 1/60 sec and flashing period of fluorescent lamp in an area in which commercial power source frequency is, for example, 50 Hz, is typically 1/100 sec. Therefore, when, in such area, an object under illumination of fluorescent lamp is imaged by a television camera, flicker noise having a period of 1/20 sec which is the least common multiple of the both numerical values, that is, having frequency of 20 Hz, is generated. The reason for generation of such flicker noise is discussed in, for example, Japanese Kokai (P) 1-204578 in which a method of reducing the effect of this flicker noise has been proposed. According to this method, flicker noise can be restricted by detecting a flickering period of a fluorescent light source by a flickering period detection circuit of a television camera and controlling a signal storage time of a photoelectric conversion element of the camera on the basis of the detected signal such that the signal storage time becomes an integer multiple of flickering period of the florescent light source.

In this conventional technique, however, there is no consideration made with respect to variation of illumination condition during imaging operation, and therefore, there is undesired sensitivity degradation of the photoelectric conversion element occurred when a light source is switched from a flickering light source such as fluorescent lamp to a non-flickering light source such as incandiscent lamp, or vice versa, during imaging operation. For example, in order to restrict flicker noise when an imaging is being performed with a television camera of NTSC system under illumination of fluorescent lamp in an area in which the flickering period of fluorescent lamp is 1/100 sec, it is necessary to regulate the signal storage time of photoelectric conversion element to 1/100 sec in which case the sensitivity of the photoelectric conversion element is lowered by about 4 dB compared with the imaging with image storage time of the photoelectric conversion element being 1/60 sec for normal non-flickering illumination.

In order to improve an image quality during imaging under fluorescent lamp illumination, it is better to restrict flicker noise while allowing degradation of sensitivity of the photoelectric conversion element. However, when the fluorescent lamp is switched to nonflickering lamp such as incandiscent lamp during imaging, the sensitivity may be degraded by about 4 dB since signal storage time of 1/100 sec is kept as it is.

SUMMARY OF THE INVENTION

An object of the present invention is to provide a television camera capable of imaging with an optimum signal storage time of a photoelectric conversion element even if illumination condition is changed during imaging operation.

The above object can be achieved according to the present invention by providing detection means for detecting a variation of illumination light, controlling signal storage time of a photoelectric conversion element of the television camera on the basis of flickering period of illumination light such that it becomes an integer multiple of the flickering period and changing the signal storage time of the photoelectric conversion element to a predetermined another time when the detection means detects a change of illumination light.

The detection means for detecting change of illumination light may be realized by detecting an iris value of an automatic iris control portion of the television camera and a change exceeding a constant amount of gain of an automatic gain control of the television camera. Alternatively, the detection means also may be achieved by detecting a change of color temperature of an object to be imaged beyond a certain constant value.

It is possible to restrict flicker noise under flickering illumination by, first, detecting flickering period of illumination light by the detection means and, second, selecting signal storage time of the photoelectric conversion element as an integer multiple of the detected flickering period. Then, it is possible to restrict degradation of sensitivity of the photoelectric conversion element under illumination light other than flickering illumination by detecting variation of illumination light and changing the signal storage time according thereto.

BRIEF DESCRIPTION OF THE DRAWINGS

The above mentioned and other objects, features and advantages of the present invention will become more apparent to those skilled in the art when the following disclosure is read in conjunction with the accompanying drawings wherein.

DETAILED DESCRIPTION OF THE PREFERRED EMBODIMENT

An embodiment of the present invention will be described with reference to FIG. 1.

Figure 1:
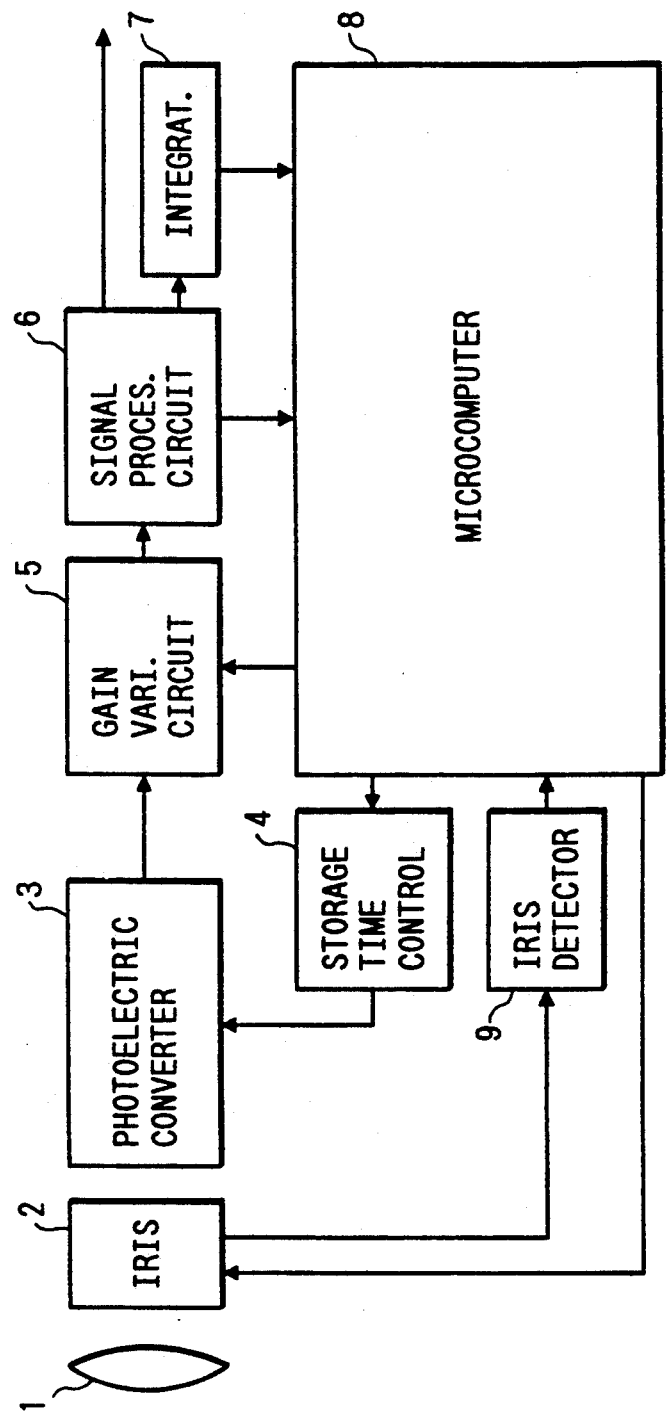
FIG. 1 is a block diagram showing an embodiment of the present invention.

In FIG. 1, light incident through a lens 1 is regulated in light amount by an iris 2 and converted into an electric signal by a photoelectric conversion element 3. The electric signal is passed through a variable gain circuit 5 and processed by a signal processing circuit 6 an output of which is a television signal. The television signal from the signal processing circuit 6 is also supplied to an integrater circuit 7 and to a microcomputer 8. The photoelectric conversion element 3 used in this embodiment has signal storage time which is adjustable by a signal storage time control circuit 4. A method of controlling signal storage time is disclosed in Japanese Kokai (P) 01-204578 and therefore detailed description thereof is omitted in this specification.

The microcomputer 8 controls the iris 2 and gain of the variable gain circuit 5 on the basis of the signal input from the signal processing circuit 6 such that an amount of signal input to the photoelectric conversion element 3 and the signal processing circuit 6 become optimum. Value of the iris 2 is detected by an iris value detection circuit 9 and input to the micro computer 8. Further, the micro computer 8 outputs a signal to the signal storage time control circuit 4, by which the signal storage time is made variable. The integrator circuit 7 functions to accumulate signal for every field period and to sample/hold the integrated signal.

Figure 2:
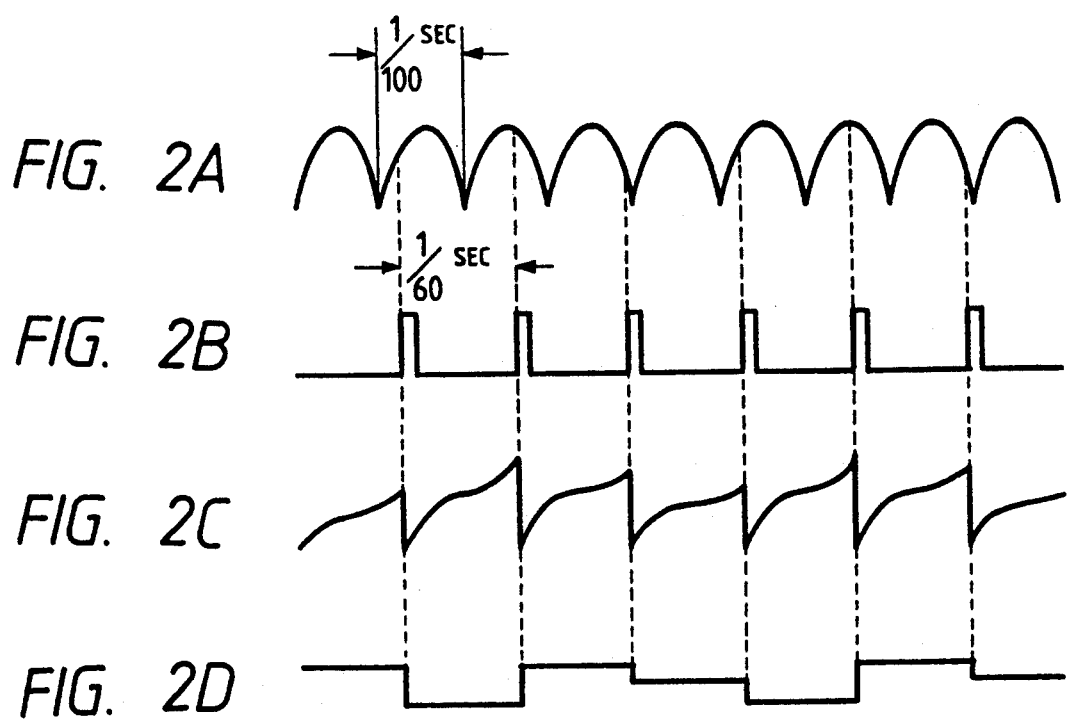
FIG. 2A-2D shows waveforms for explanatory purpose of an operation of a portion of the embodiment shown in FIG. 1.

An operation of the integrator circuit 7 will be described with reference to FIG. 2 assuming that an image is obtained by such camera of NTSC system with field frequency of 60 Hz in an area where commercial power source frequency is 50 Hz. In FIG. 2, capital letters A and B indicate intensity of light from a fluorescent lamp and a vertical scanning period of a television, that is, timing of vertical blanking, respectively. When an object under illumination of the fluorescent lamp whose intensity is varying as shown by A is imaged by the camera at the timing shown by B, a signal obtained by integrating image signal for each field period has a waveform shown by C which is a repetition of three different waveforms. This is flicker noise of 20 Hz. When the signal C is sampled/held at the end of each field, a signal D is obtained.

Figure 3:
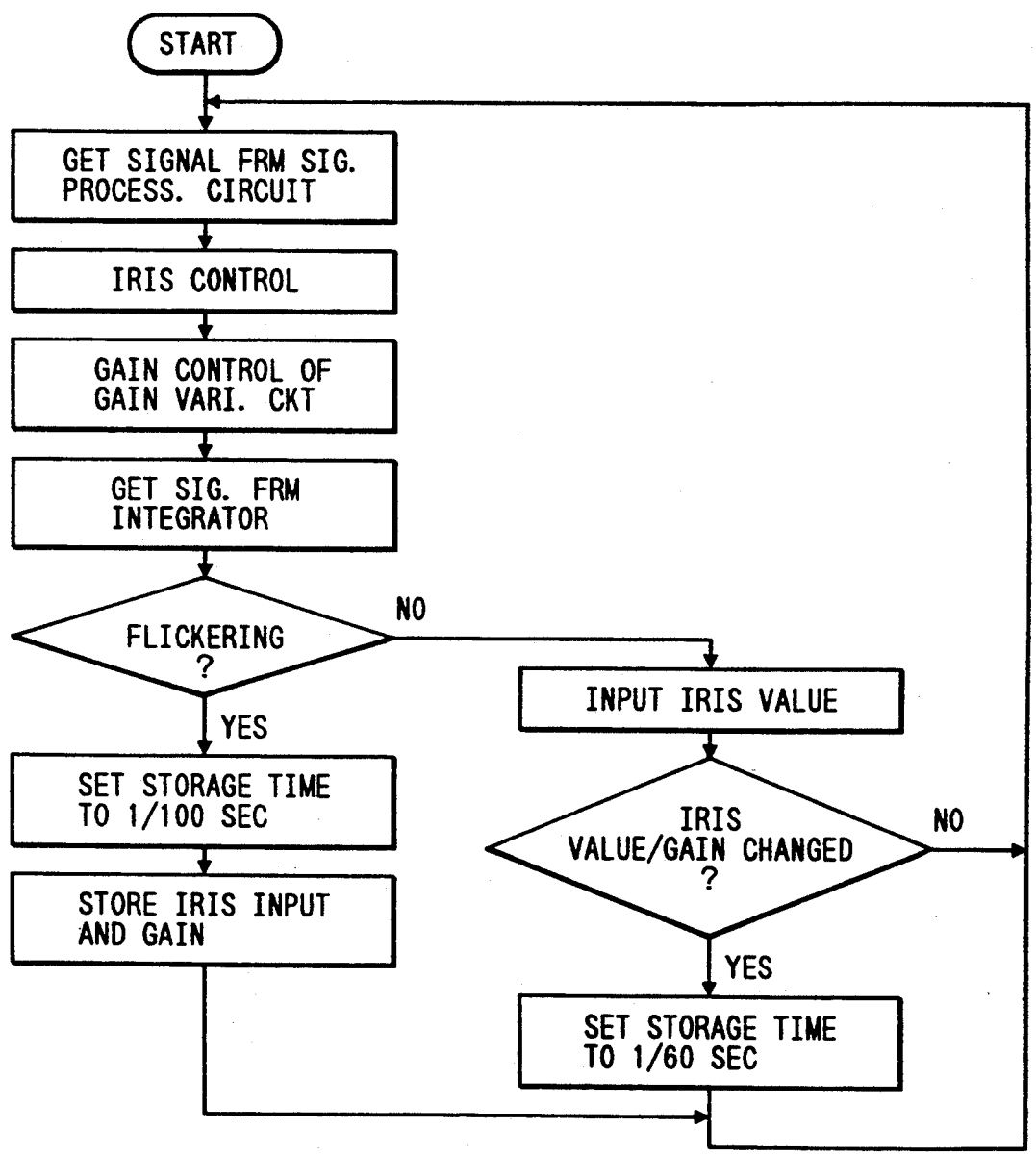
FIG. 3 is a flowchart explaining an operation of a microcomputer 8.

FIG. 3 is a flowchart showing a control algorithm of the microcomputer 8 for restricting flicker noise under flickering light source and preventing sensitivity of the photoelectric conversion element under non-flickering light source from being degraded. As mentioned previously, the microcomputer 8 controls value of the iris 2 and gain of the variable gain circuit 5 according to the input signal from the signal processing circuit 6. Then, the microcomputer 8 determines whether or not flicker exists, according to the input signal from the integrator circuit 7. The determination of flicker can be done by storing the input signal from the integrator circuit 7 for at least 1 field period, sequentially comparing it with a stored input signal for an immediately preceding field and checking regularity such as shown by D in FIG. 2. When it determines a presence of flicker noise, the signal storage time of the photoelectric conversion element 3 is switched to 1/100 sec through the signal storage time control circuit 4. Thereafter, the microcomputer 8 stores one or more of (i) the iris value which is supplied thereto from the iris value detection circuit 9, (ii) the gain which is output to the variable gain circuit 5, and (iii) the color temperature. By setting the signal storage time to 1/100 sec upon detection of flicker, a difference in signal amount between adjacent fields is eliminated and thus flicker can be restricted.

Therefore, a next determination of flicker becomes negative necessarily. In this case, the microcomputer 8 determines whether or not differences (i) between a current iris value and the stored iris value stored when flicker was detected, (ii) between a current gain, or (iii) between the current color temperature and the stored color temperature and the stored gain exceed certain constant values, respectively.

Assuming that an illumination light source is changed from a flashing lamp such as fluorescent lamp to a non-flickering light source such as an incandiscent bulb or solor light, there is very strong probability of intensity change of light reflected from an object at the time of the illumination switching. Intensity change of light from an object is reflected to changes of iris value and gain value. Therefore, when iris value and/or gain is exceeds a certain constant amount, it is deemed as a change of light source from a first light source such as a flickering lamp to a second light source such as non-flickering lamp and signal storage time of the photoelectric conversion element is immediately changed to 1/60 sec.

In this case, if the second light source is not non-flickering lamp but another flickering lamp regardless of considerable changes of iris value and gain, flicker thereby is immediately detected and signal storage time is changed again to 1/100 sec. Therefore, the effect of flicker noise restriction is not lost even if the signal storage time is temporarily switched to 1/60 sec.

Thus, degradation of sensitivity of the photoelectric conversion element and hence the television camera under non-flickering light source is prevented and flicker under flickering light source is restricted by this algorithm.

Although, in this embodiment, a switching of light source from one to another is detected by detecting changes of iris value and/or gain, it is possible to detect such light source switching by determining an amount of change of white balance correction value instead of iris and/or gain when the microcomputer 8 controls white balance correction with respect to the signal processing circuit 6. This is because change from a flickering light source such as fluorescent lamp to a non-flickering light source such as incandiscent lamp or solar occurs with change of color temperature and therefore white balance correction value also changes.

As described hereinbefore, according to the present invention, it is possible to image an object by the camera with an optimum signal storage time of the photoelectric conversion element of the camera even if an illuminating condition is changed during imaging operation. Therefore, it is always possible to obtain a high quality image without sensitivity degradation which was inherent to the conventional device.

Although the present invention has been described with reference to specific embodiments, this description is not meant to be construed in a limiting sense. Various modifications of the disclosed embodiment, as well as other embodiments of the present invention, will become apparent to those skilled in the art upon reference to the description of the present invention. It is therefore contemplated that appended claims will cover any modifications or embodiments as fall within the true scope of the present invention.

What is claimed is:

1. In a television camera having an optical system, an iris device, an automatic iris control device for automatically controlling opening of said iris device, a photoelectric conversion element for converting an optical image obtained through said optical system and said iris device into an electric signal, an automatic gain control device for controlling gain of the electric signal, a first detection means responsive to flickering in the electric signal at an output of said photoelectric conversion element for detecting flickering at a flickering frequency of a first illumination light source, each half cycle of the flickering frequency defining a flickering period, a signal storage time control means for controlling a signal storage time of said photoelectric conversion element such that in response to the first detection means detecting the flickering, the signal storage time is controlled to become an integer multiple of the flickering period of said first light source, whereby changing the signal storage time to an integer multiple of the flickering period substantially eliminates flicker in the electric signal at the output of the photoelectric conversion element, THE IMPROVEMENT COMPRISING:

a second detection means including:
- a means for storing a current iris value in response to the first detection means detecting the flickering frequency, current iris values with the stored iris value, and
- a means connected with the signal storage time control means for causing the signal storage time control means to change the signal storage time of said photoelectric conversion element from the integer multiple of the flickering period to a predetermined time different from the time which is the integer multiple of the flickering period when said comparing means detects a change in the iris value above a preselected minimum change indicative of a switching of said first light source to another light source.

2. The television camera claimed in claim 1, wherein said first detection means comprises an integration circuit for integrating a whole or a portion of the output signal from said photoelectric conversion element for each field period and a control and processing device responsive to an output from said integration circuit to operate, store and compare a difference in signal intensity between adjacent field periods.

3. The television camera claimed in claim 1, wherein said second detection means comprises a control and processing device responsive to an iris value of said automatic iris control device and a gain value of said automatic gain control device to store an iris value and a gain value when said first detection means detects the flickering frequency of said light source and to detect changes of iris value and gain from said stored iris value and gain value by amounts exceeding certain constant values, respectively.

4. In a television camera having an optical system, an iris device, an automatic iris control device for automatically controlling opening of said iris device, a photoelectric conversion element for converting an optical image obtained through said optical system and said iris device into an electric signal, a first detection means responsive to flickering in the electric signal at an output of said photoelectric conversion element for detecting flickering at a flickering frequency of a first illumination light source, each half cycle of the flickering frequency defining a flickering period, a signal storage time control means for controlling a signal storage time of said photoelectric conversion element such that in response to the first detection means detecting the flickering, the signal storage time is controlled to become an integer multiple of the flickering period of said firs light source, whereby changing the signal storage time to an integer multiple of the flickering period substantially eliminates flicker in the electric signal at the output of the photoelectric conversion element, THE IMPROVEMENT COMPRISING:

a second detection means including:
- a means for storing a color temperature information value in response to said first detection means detecting the flickering frequency,
- a means for comparing subsequent color temperature information values with said stored color temperature information, and
- a means connected with the signal storage time control means for causing the signal storage time control means to change the signal storage time of said photoelectric conversion element from the integer multiple of the flickering period to a predetermined time different from the integer multiple of the flickering period in response to said comparing means detecting the change of color temperature information values exceeding a preselected minimum change indicative of a switching from said first light source to another light source.

5. A television camera having flicker noise restriction capability, which camera includes a lens system, an iris device, a photoelectric conversion element disposed behind said iris device for converting an optical image received through said lens system and said iris device into an electric signal, an iris control device, a variable gain circuit for regulating gain of said photoelectric conversion element and a signal processing circuit for processing the electric signal from said photoelectric conversion element to obtain a television signal, said television camera comprising:

- first means responsive to an output signal of said signal processing circuit to supplying control signals for controlling said iris control device and said variable gain circuit;
- an integrater circuit for integrating the television signal for a time corresponding to one field period and sampling and holding an integrated television signal every field;
- second means responsive to an output of said integrater circuit for determining whether or not there is flicker noise;
- third means for regulating signal storage time of said photoelectric conversion element to 1/100 sec and storing an iris value and a gain when said second means determines existence of flicker noise;
- fourth means responsive to an iris value and a gain for determining whether or not there is any change in iris value and gain when said second means determines absence of flicker noise;
- fifth means for changing signal storage time of said photoelectric conversion element to 1/60 sec when said fourth means determines an existence of change of iris value and gain.

* * * * *

UNITED STATES PATENT AND TRADEMARK OFFICE
CERTIFICATE OF CORRECTION

PATENT NO. : 5,293,238
DATED : March 8, 1994
INVENTOR(S) : Takahiro Nakano, et al.

It is certified that error appears in the above-indentified patent and that said Letters Patent is hereby corrected as shown below:

Claim 1, column 5, line 10, after "frequency," enter a space, indent and insert --a means for comparing subsequent--.

Claim 4, column 5, line 56, delete "firs" and substitute --first--.

Signed and Sealed this

Twenty-eighth Day of June, 1994

Attest:

BRUCE LEHMAN

*Attesting Officer*     *Commissioner of Patents and Trademarks*